United States Patent
Di Florio et al.

(10) Patent No.: US 8,591,195 B2
(45) Date of Patent: Nov. 26, 2013

(54) TURBINE BLADE WITH PRESSURE SIDE STIFFENING RIB

(75) Inventors: Domenico Di Florio, Pincourt (CA); Aldo Abate, Longueuil (CA)

(73) Assignee: Pratt & Whitney Canada Corp., Longueuil (CA)

( * ) Notice: Subject to any disclaimer, the term of this patent is extended or adjusted under 35 U.S.C. 154(b) by 777 days.

(21) Appl. No.: 12/789,983

(22) Filed: May 28, 2010

(65) Prior Publication Data

US 2011/0293436 A1  Dec. 1, 2011

(51) Int. Cl.
*F01D 5/18* (2006.01)

(52) U.S. Cl.
USPC ........ 416/224; 416/228; 416/235; 416/236 R; 416/237

(58) Field of Classification Search
USPC ................... 416/224, 228, 235, 236 R, 237
See application file for complete search history.

(56) References Cited

U.S. PATENT DOCUMENTS

| | | | |
|---|---|---|---|
| 8,430 A * | 10/1851 | Sheetz | ............ 416/237 |
| 10,124 A * | 10/1853 | Beard | ............ 416/236 R |
| 2,010,094 A | 8/1935 | Leinweber | |
| 3,193,185 A | 7/1965 | Erwin et al. | |
| 4,108,573 A * | 8/1978 | Wagner | ............ 416/236 A |
| 4,128,363 A | 12/1978 | Fujikake et al. | |
| 4,265,596 A | 5/1981 | Katagiri et al. | |
| 4,757,587 A | 7/1988 | Choi | |
| 5,215,441 A | 6/1993 | Evans et al. | |
| 5,282,721 A * | 2/1994 | Kildea | ............ 416/97 R |
| 5,368,508 A | 11/1994 | Whittington | |
| 6,565,324 B1 * | 5/2003 | Phillipsen et al. | ........ 416/236 R |
| 6,779,979 B1 | 8/2004 | Wadia et al. | |
| 7,270,519 B2 | 9/2007 | Wadia et al. | |

* cited by examiner

*Primary Examiner* — Igor Kershteyn
(74) *Attorney, Agent, or Firm* — Norton Rose Fulbright Canada LLP

(57) ABSTRACT

A turbine blade adapted for mounting to a turbine rotor includes a root portion, and an airfoil portion extending outward from the root portion and defining a blade tip at an outermost end thereof. The airfoil portion having a pressure side and a suction side opposite the pressure side, and including a stiffening rib disposed at the blade tip. The stiffening rib projects from the pressure side of the airfoil portion of the turbine blade.

18 Claims, 5 Drawing Sheets

FIG_4

TURBINE BLADE WITH PRESSURE SIDE STIFFENING RIB

TECHNICAL FIELD

The application relates generally to gas turbine engines and, more particularly, to turbine blades thereof.

BACKGROUND OF THE ART

Due to the high angular velocities of gas turbine engine rotors, various challenges arise for the person designing a new rotor blade, including vibrations in the turbine blades. Various methods and/or blade configurations exist for addressing such challenges. For instance, it is known to remove a trailing edge portion near the tip of a turbine blade in order to tune the modes of vibration of a blade. This is sometimes referred to as providing a "cut-back" on the blade, which in essence removes the portion of the airfoil subject to so-called second mode bending. However, the removal of this portion of the turbine blade tends to sacrifice aerodynamic performance.

In light of these problems affecting turbine blades, improvements are sought.

SUMMARY

In one aspect, there is provided a cambered turbine blade comprising a root portion and an airfoil portion, the airfoil portion extending radially outward from the root portion and defining a blade tip at a radially outermost end thereof, the airfoil portion including a leading edge, a trailing edge opposite the leading edge, a pressure side located between the leading edge and the trailing edge, a suction side opposite the pressure side, the pressure side having a pressure surface extending from the root portion to the blade tip, and a stiffening rib extending from the blade tip exclusively on the pressure side of the airfoil portion, the stiffening rib projecting substantially perpendicularly from the pressure surface, the stiffening rib projecting at least a portion of a tangential distance from the pressure surface to a chord extending between the trailing edge and the leading edge, the stiffening rib extending in at least a chordwise direction beginning at the trailing edge and spanning at least a portion of the region of the airfoil portion enclosed between the trailing edge and the leading edge.

In another aspect, there is provided a gas turbine engine comprising a compressor section, a combustor section and a turbine section, the turbine section including at least one rotor having a plurality of circumferentially-arrayed turbine blades, each turbine blade including a root portion and an airfoil portion extending radially outward from the root portion, the airfoil portion having a blade tip formed at a radial extremity of the airfoil portion, and a stiffening rib located only on a pressure side of the airfoil portion and in proximity of the blade tip, the stiffening rib including an inner radial surface, an outer radial surface located opposite the inner radial surface, and a remote outer edge located between the inner and outer radial surfaces, the outer edge being spaced apart perpendicularly from the pressure surface of the airfoil portion, the stiffening rib spanning at least a portion of a region of the airfoil portion enclosed between the trailing edge and the leading edge.

DESCRIPTION OF THE DRAWINGS

Reference is now made to the accompanying figures in which.

DETAILED DESCRIPTION

Figure 1:
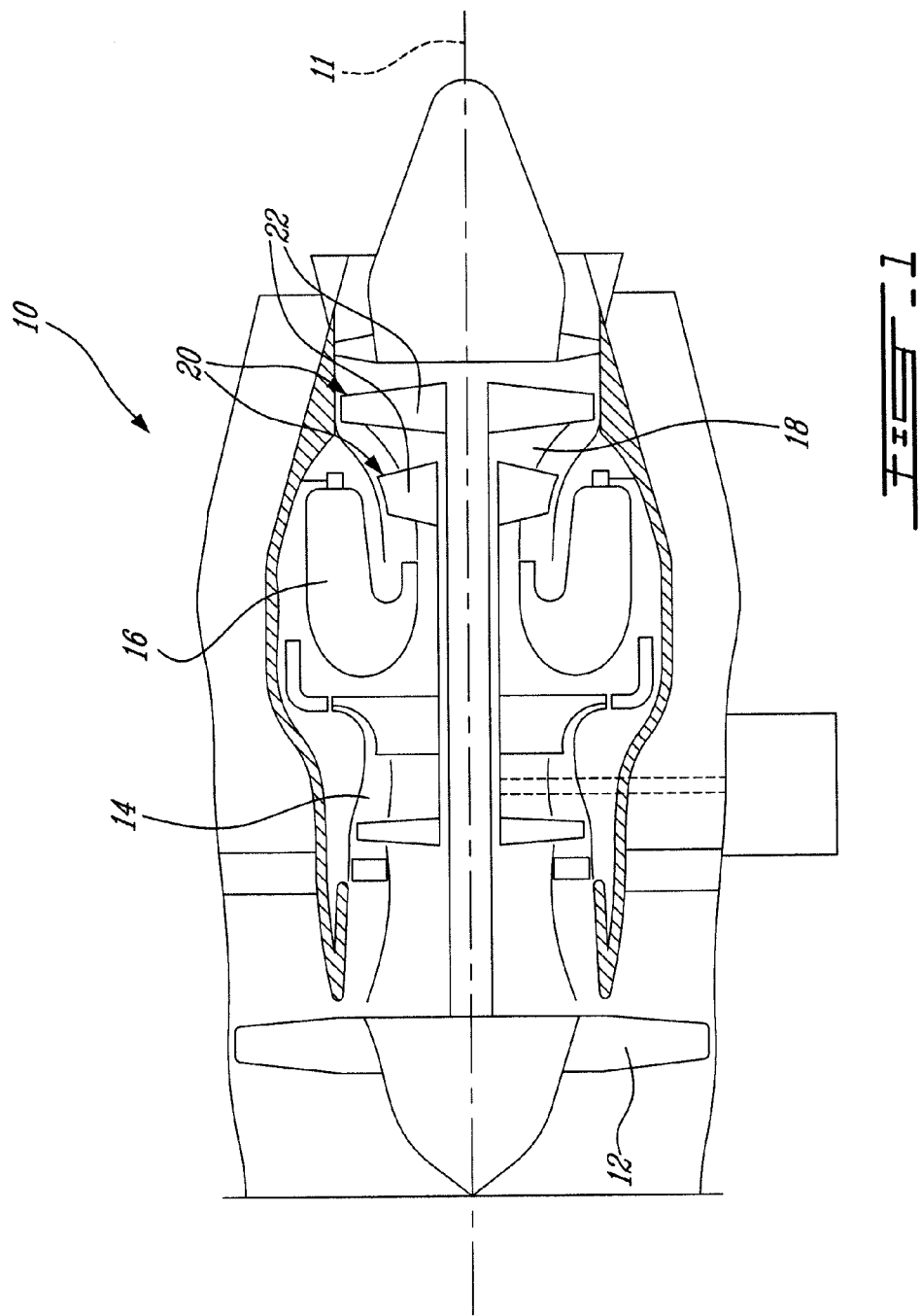
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The gas turbine engine 10 defines a longitudinal central axis 11.

The turbine section 18 includes at least one, but generally a plurality of turbine rotors 20. The turbine rotors 20 each comprise an annular hub (not shown) and a plurality of circumferentially-disposed turbine blades 22 attached thereto. The turbine blades 22 extend radially relative to the longitudinal central axis 11 which additionally defines a central axis of the turbine rotors.

Figure 2:
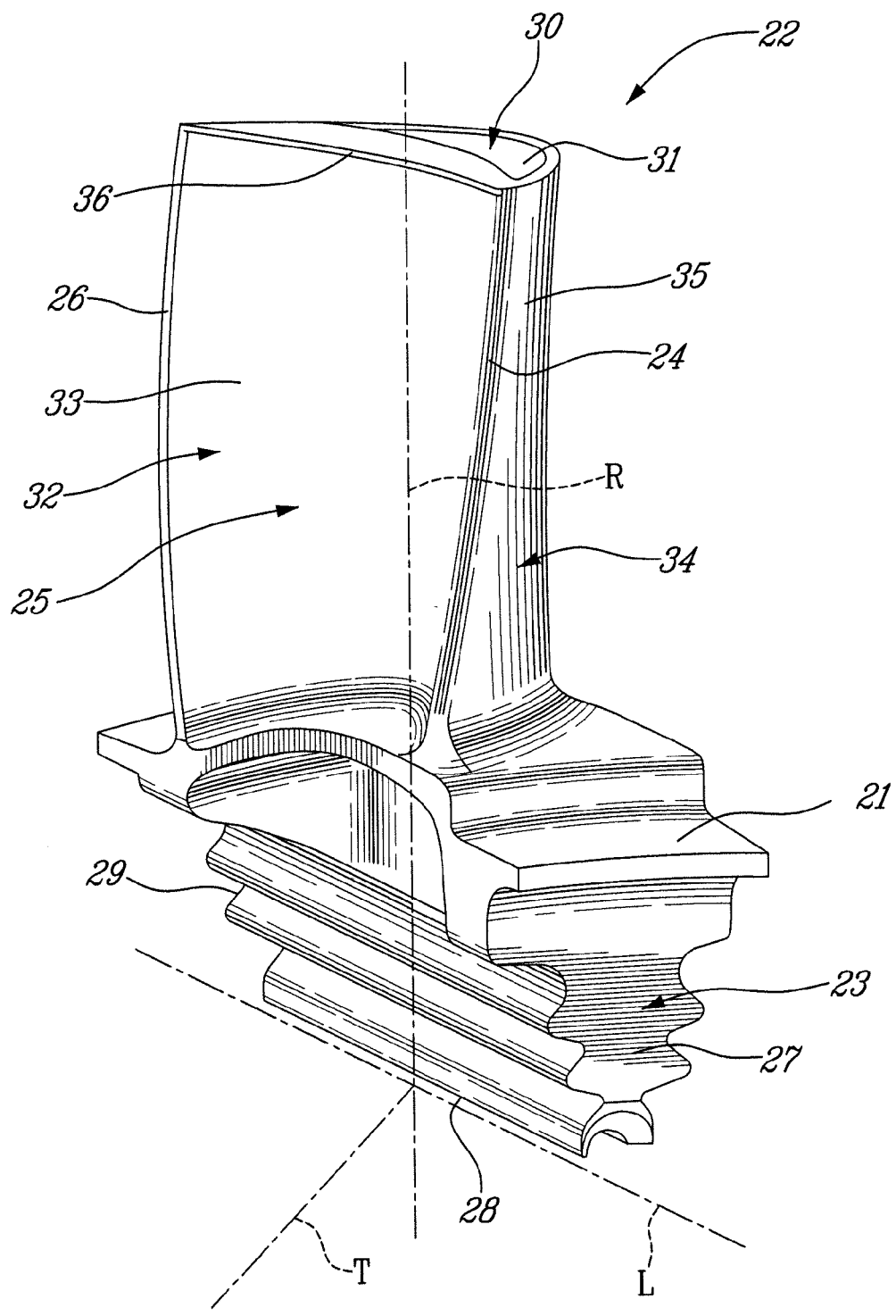
FIG. 2 is a first perspective view of a turbine blade which may be used in a turbine of the gas turbine engine of FIG. 1.

As seen in FIG. 2, each turbine blade 22 has a root portion 23, an airfoil portion 25 extending radially outward from the root portion 23 and a stiffening rib 36 proximate a tip of the airfoil portion, as will be described in further detail below. The turbine blades 22 described herein are preferably cambered and un-cooled, i.e. substantially free of cooling air passages extending therethrough. However, it is understood that other types of turbine blades and/or gas turbine engine airfoils can be similarly provided with a stiffening rib 36 as described herein. The root portion 23 of the turbine blade 22 includes a platform portion 21 at an outer radial end thereof, the platform portion 21 being connected to the airfoil portion 25. The root portion 23 of each turbine blade 22 is received with correspondingly-shaped firtree slots in the annular hub of the turbine rotor 20. The airfoil portion 25 of the turbine blade 22 extends into a gas path accommodating the annular stream of hot combustion gases generated by the combustor 16, the hot combustion gases acting on the airfoil portion 25 of the turbine blades 22 and causing the turbine rotor 20 to rotate. Each turbine blade 22 defines a local coordinate axis comprising three orthogonal axis: a longitudinal axis L which extends from a front end 27 of the turbine blade 22 to a rear end 29 thereof, a radial axis R which extends from an inner radial end 28 of the turbine blade to a blade tip 30, and a tangential axis T. The radial axis R is normal to a tangential plane, the tangential plane being the plane formed by the longitudinal and tangential axis' L, T. In the embodiment shown, the longitudinal axis L of the turbine blade 22 is parallel to the longitudinal central axis 11 of the gas turbine engine 10, however, in an alternative embodiment, the longitudinal axis' L, 11 may not be parallel. Note that all directions specified in this disclosure are defined with respect to the local coordinate axis, unless otherwise specified.

Figure 5:
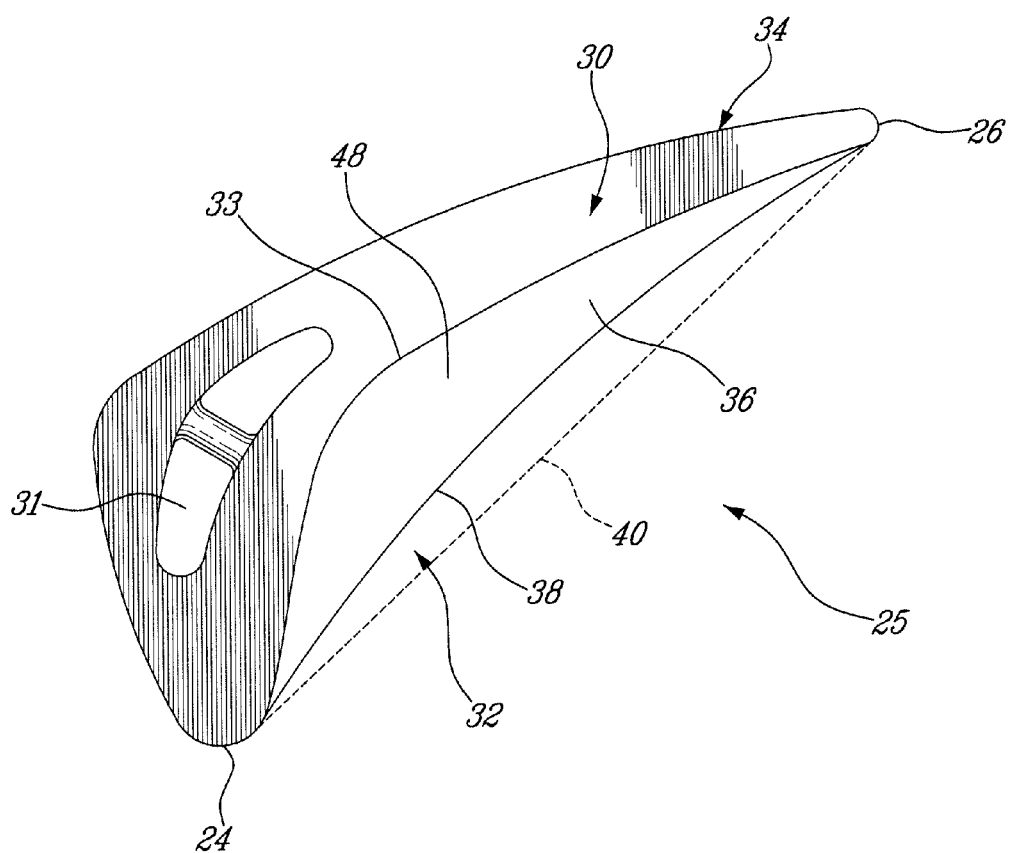
FIG. 5 is a schematic top plan view of an alternate turbine blade.

The airfoil portion 25 of the turbine blade 22 includes a leading edge 24 and a trailing edge 26, the trailing edge 26 being positioned further aft longitudinally than the leading edge 24. The airfoil portion 25 extends in a radial direction from the platform portion 21 to the blade tip 30, which is located at an outer radial end of the airfoil portion 25. As best seen in FIG. 5, the airfoil portion 25 of the turbine blade 22 is cambered (i.e. curved camber line) as is typical in the art of turbine blade airfoils. The turbine blade depicted is uncooled (i.e. no internal passageways through which secondary cooling air is circulated), and is thus otherwise solid but for the pocket opening 31 defined in the blade tip 30, as seen in FIGS. 2 and 3.

As seen in FIGS. 2-5, the airfoil portion 25 includes a pressure side 32 having a generally concave shape, and a suction side 34 located opposite the pressure side 32, the suction side 34 having a generally convex shape. The thickness of the airfoil portion 25 is generally defined as the distance between the pressure side 32 of the airfoil portion 25 and the suction side 34 thereof.

Figure 3:
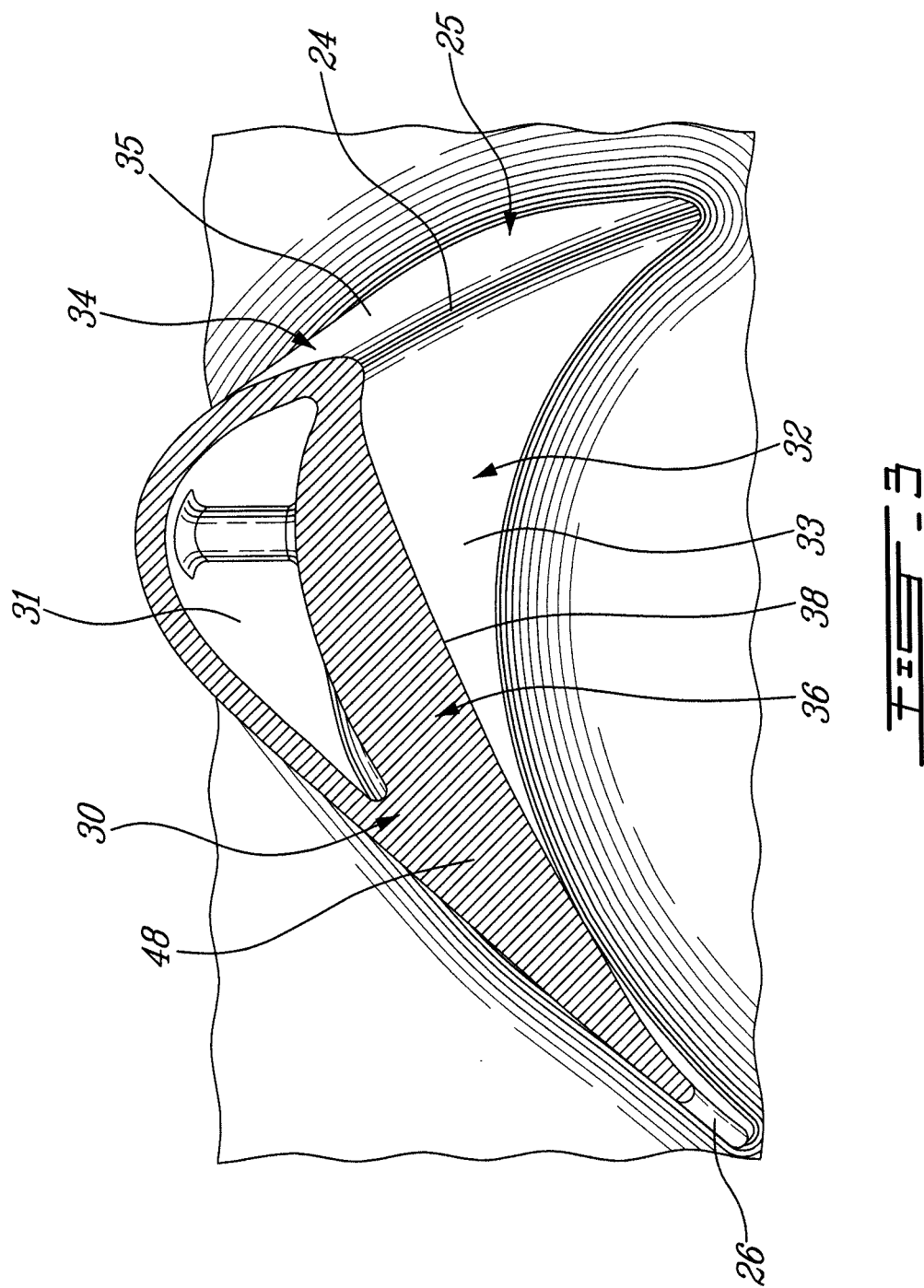
FIG. 3 is a top elevation view of the turbine blade of FIG. 2.
Figure 4:
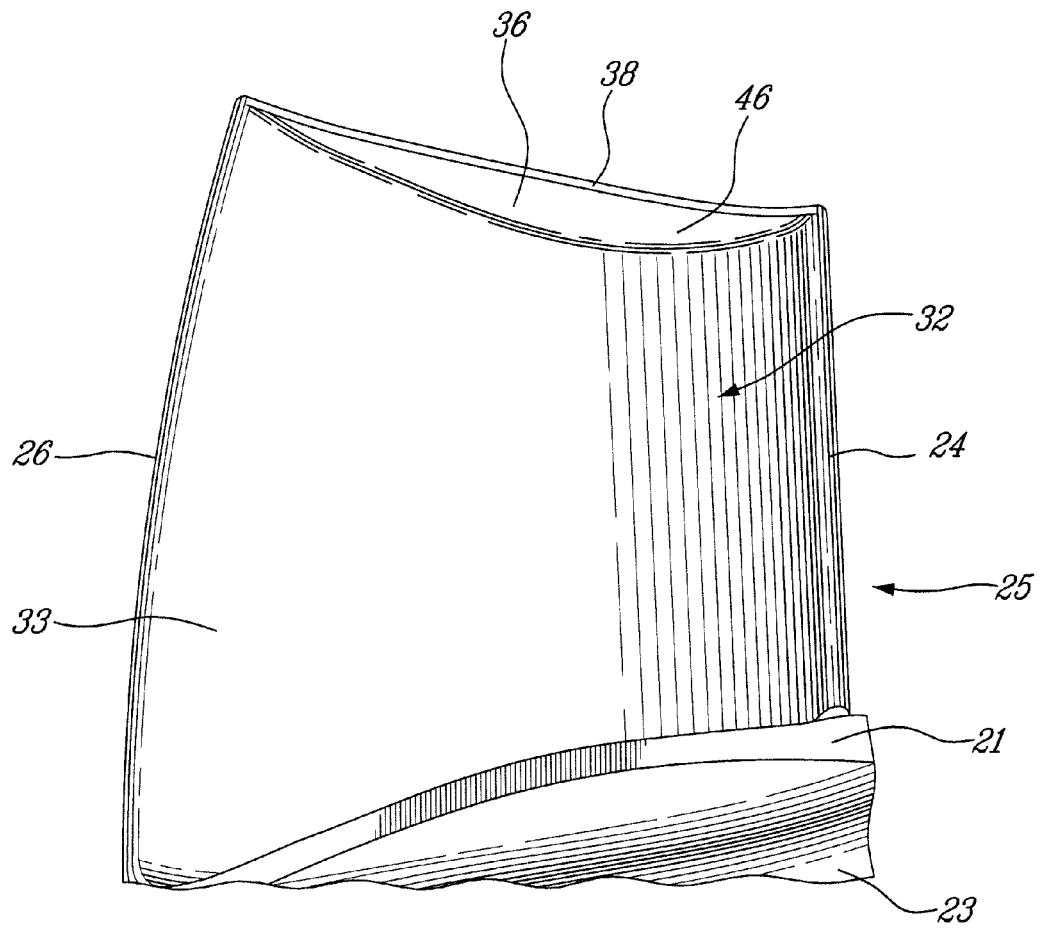
FIG. 4 is a second perspective view of the turbine blade of FIG. 2.

Referring to FIGS. 2-4, the airfoil portion 25 of the turbine blade 22 includes a pressure surface 33 on the pressure side 32 thereof, the pressure surface 33 extending from the platform portion 21 of the root portion 23 to the blade tip 30. The airfoil portion 25 further includes a suction surface 35 on the suction side 34 thereof, the suction surface 35 extending from the platform portion 21 of the root portion 23 to the blade tip 30.

The airfoil portion 25 comprises a stiffening rib 36 at the blade tip 30 on the pressure side 32 thereof. In one embodiment, the stiffening rib 36 extends only, i.e. exclusively, in a tangential direction (i.e. perpendicularly) from the pressure surface 33. The stiffening rib 36 includes an inner radial surface 46, an outer radial surface 48 located opposite the inner radial surface 46, and a remote outer edge 38 located between the inner and outer radial surfaces 46, 48 and forming an outer periphery thereof. The remote outer edge 38 is spaced apart from the pressure surface 33, such that the stiffening rib 36 forms an extension of the airfoil portion 25 on the pressure side 32. Therefore, the airfoil portion 25 has a greater thickness at the blade tip 30 where the stiffening rib 36 is located as compared to another radial position of the airfoil portion 25 where the stiffening rib 36 is not present.

As seen in FIG. 5, the airfoil portion 25 includes a chord 40 which forms a line extending substantially between the trailing edge and the leading edge of the airfoil portion 25. The chord 40 defines a chordwise axis, such that a chordwise direction is defined along, or at least parallel to, the chord 40. The stiffening rib 36 is located in a plane defined by the chordwise axis and a tangential axis perpendicular to the pressure surface 33, such that the stiffening rib 36 forms a projection on the pressure side 32 of the airfoil portion 25 in the afore-mentioned plane. Although the stiffening rib 36 has been described as forming a projection in the plane defined by the chordwise axis and the tangential axis, it is understood that the stiffening rib 36 is a three-dimensional component, the inner and outer radial surfaces 46, 48 being spaced one from the other and including a radial thickness therebetween.

In one embodiment, the outer edge 38 of the stiffening rib 36 and the chord 40 are collinear such that the stiffening rib 36 extends thereto. In another embodiment, as shown in FIG. 5, the stiffening rib 36 may extend only a portion of the distance to the chord 40. In at least one possible embodiment, therefore, the chord 40 forms a boundary of the outer edge 38, and so a limit of the tangential extension of the stiffening rib 36 from the pressure surface 33, i.e. of its protrusion on the pressure side 32 of the airfoil portion 25, such that the stiffening rib 36 may extend to the chord. In at least this embodiment, the stiffening rib 36 is therefore bounded by the chord 40 and may be located exclusively in a region encompassed between the pressure surface 33 and the chord 40.

The distance between the trailing edge 26 and the leading edge 24 on the airfoil portion 25 at a same radial distance from the root portion forms a chordwise length of the airfoil portion 25, the distance between two points (other than the trailing edge and the leading edge) located on the pressure side 32 of the airfoil portion 25 at a same radial distance from the root portion forming a portion of the chordwise length of the airfoil portion 25. As seen in FIGS. 2-3, the stiffening rib 36 extends in a chordwise direction from a point in proximity of the trailing edge 26 to a point in proximity of the leading edge 24. Alternatively, the stiffening rib 36 may extend from the trailing edge 26 to any point on the pressure side 32 which is spaced apart from the leading edge 24 or from the leading edge 24 to any point on the pressure side 32 which is spaced apart from the trailing edge 26. As such, the stiffening rib 36 need not extend exclusively in a chordwise direction from the trailing edge 26, but may additionally extend inner tangentially therefrom, i.e. towards the pressure surface 33. Moreover, the stiffening rib 36 may extend a full chordwise length from the trailing edge 26 to the leading edge 24 or may span any lesser portion of the chordwise length therebetween on the pressure side 32, according to various embodiments. The extension of the stiffening rib 36 in the chordwise direction is constrained by the leading and trailing edges 24, 26 and as such, the stiffening rib 36 does not extend in a chordwise direction beyond the leading edge 24 or the trailing edge 26. In at least the present embodiment, the stiffening rib 36 is located exclusively in a region of the airfoil portion 25 enclosed between the trailing edge and the leading edge, and spans at least a portion of this region.

In the embodiment shown in FIG. 5, the outer edge 38 may be curved inward, such that the stiffening rib 36 has a concave radius of curvature. This inward curve reduces the size of the stiffening rib 36 as compared to an embodiment where the outer edge 38 is rectilinear, and therefore the weight of the stiffening rib 36 is reduced. Alternatively, the outer edge 38 may have various shapes, for example the outer edge 38 may be curved outward, may include a plurality of curvatures, indentations, etc.

In one embodiment, the stiffening rib 36 may be located in proximity of the blade tip 30 but spaced apart therefrom, such that the stiffening rib is not located at the outermost end of the airfoil portion 25 as it is shown in FIGS. 2-5.

In the depicted embodiment wherein the stiffening rib 36 is located at the blade tip 30, the outer radial surface 48 of the stiffening rib 36 and the blade tip 30 may both be located in a same common plane forming a radially outermost surface of the airfoil portion. In an alternative embodiment, the outer radial surface 48 of the stiffening rib 36 may be located in a plane which is angled with respect to a plane in which the blade tip 30 is located.

In one embodiment, the inner radial surface 46 of the stiffening rib 36 is perpendicular to the pressure surface 33 of the airfoil portion 25. In another embodiment, the angle between the inner radial surface 46 of the stiffening rib 36 and the pressure surface 33 of the airfoil portion 25 in the plane formed by the radial and tangential axis R, T, is at least 92.5 degrees in order to reduce stresses generated therein.

In use, turbine blades 22 may be exposed to large vibrational stresses. When used in gas turbine engines, it is important that any modal interference in the turbine blades 22 due to vibrations be minimized within the engine's operating rotational speed range. One example of modal interference is stiffwise bending which may be caused from interference with the upstream vane count. If stiffwise bending modal interference is not tuned out, the turbine blades 22 may crack and could potentially fail. By including the stiffening rib 36 on the pressure side 32 of the turbine blade 22 at the blade tip 30, the local stiffness at the trailing edge of the blade tip is increased, which varies the frequencies of the modes of vibration.

During preliminary tests run by the applicant, a turbine blade 22 having the stiffening rib 36 was compared to a turbine blade lacking the stiffening rib 36. The results showed that for the turbine blade 22 including a stiffening rib, the frequency of the first fundamental mode was decreased, the frequency of the second fundamental mode was increased, the frequency of the third fundamental mode was decreased and the frequency of the fourth fundamental mode was increased. As such, the frequency of the second fundamental mode, i.e. the stiffwise bending mode, was sufficiently increased to tune out interferences with the $1^{st}$ harmonic of upstream vane count, and to tune out the second mode of interference with the upstream vane count outside the gas turbine engine rotor speed range with sufficient margin. The decrease in the frequency of the third fundamental mode may assist to decouple the third fundamental mode from the fourth fundamental mode. The increase in the frequency of the fourth fundamental mode may assist to tune out interferences with the second or third harmonic of upstream vane count. Therefore, within the engine's operating range, the stiffening rib may contribute to tuning out modal interferences in the turbine blades 22 due to vibrations. In different embodiments, in order to customize the frequency variations of the fundamental modes, the size and shape of the stiffening rib 36 of the turbine blade 22 may be varied according to specific engine requirements as desired.

The stiffening rib 36 of the turbine blade 22 additionally helps to reduce the amount of aerodynamic leakage losses at the blade tip, i.e. the amount of air which flows from the pressure side 32 of the turbine blade 22 over the blade tip 30 and to the suction side 34. Aerodynamic leakage losses reduce the performance and efficiency of turbine blades 22 and, as such, the stiffening rib 36 helps to minimize these performance losses by preventing the easy flow of air from the pressure side 32 to the suction side 34 across the blade tip 30.

The stiffening rib 36 of the airfoil portion 25 of the turbine blade 22 may be formed using a casting process and may be cast together with the remainder of the turbine blade 22, so as to form one integral part.

It is understood that a reduction in the weight of the stiffening rib may contribute to an increase in the performance of the turbine blade. Therefore, the interface between the outer edge 38 of the stiffening rib 36 and the inner and outer radial surfaces 46, 48 thereof may be curved, for example, the outer edge 38 may have a radius of curvature of 0.015". In an alternative embodiment, the interface between the outer edge 38 of the stiffening rib 36 and the inner and outer radial surfaces 46, 48 may be rectilinear. It is understood that having a curved outer edge 38 requires less material and so comprises a smaller weight when compared to a rectilinear outer edge 38. Moreover, the interface between the outer edge 38 and the outer radial surface 48 of the stiffening rib 36 may be ground such that any extra material located thereon due to the casting process may be removed. Various methods of material removal known in the art may be used. Any extra material due to the casting process which is removed from the stiffening rib 36 contributes to a weight reduction of the stiffening rib 36.

In addition, in order to improve the structural integrity of the blade, particularly when the stiffening rib thereon is formed integrally therewith as part of a casting process, the interface between the pressure surface 32 and the inner radial surface 46 may include a fillet.

It should be noted that turbine blades exist in various shapes and sizes and with different properties, and for this reason, it is envisioned that the stiffening rib 36 included in the turbine blade may additionally vary in shape, size and material properties in order to be compatible therewith.

The above description is meant to be exemplary only, and one skilled in the art will recognize that changes may be made to the embodiments described without departing from the scope of the invention disclosed. For example, the invention may be used not only in aircraft gas turbine engines, but additionally with other types of gas turbine engines and moreover, may be used not only in gas turbine engines, but also in other applications where turbine blades are used. Further, although described herein with respect to a turbine blade, it is to be understood that the present stiffening rib may also be applied to a compressor blade and that a compressor rotor airfoil having such a pressure side stiffening rib is also disclosed. Still other modifications which fall within the scope of the present invention will be apparent to those skilled in the art, in light of a review of this disclosure, and such modifications are intended to fall within the appended claims.

The invention claimed is:

1. A cambered turbine blade comprising a root portion and an airfoil portion, the airfoil portion extending radially outward from the root portion and defining a blade tip at a radially outermost end thereof, the airfoil portion being uncooled and substantially solid from the root portion to the blade tip and thus free of internal cooling passageways therein, the airfoil portion including a leading edge, a trailing edge opposite the leading edge, a pressure side located between the leading edge and the trailing edge, a suction side opposite the pressure side, the pressure side having a pressure surface extending from the root portion to the blade tip, and a stiffening rib disposed at the blade tip and projecting from the pressure surface on the pressure side of the airfoil portion the stiffening rib extending at least a portion of a normal distance from the pressure surface at the blade tip to a chord extending between the trailing edge and the leading edge, and the stiffening rib extending in a chordwise direction beginning at the trailing edge and spanning at least a portion of the chord between the trailing edge and the leading edge.

2. The turbine blade as defined in claim 1, wherein the stiffening rib projects a totality of the distance between the pressure surface of the airfoil portion and the chord.

3. The turbine blade as defined in claim 1, wherein the stiffening rib extends from the trailing edge to a point at least substantially in proximity of the leading edge.

4. The turbine blade as defined in claim 3, wherein the stiffening rib extends from the trailing edge to the leading edge.

5. The turbine blade as defined in claim 1, wherein the stiffening rib includes an outer edge, the outer edge having a radius of curvature such that the stiffening rib forms a concave shape.

6. The turbine blade as defined in claim 1, wherein the stiffening rib forms a projection on the pressure side of the airfoil portion in a plane defined by a chordwise axis and an axis perpendicular to the pressure surface of the turbine blade.

7. The turbine blade as defined in claim 6, wherein the stiffening rib and the blade tip are both located in the same common plane forming a radially outermost surface of the airfoil portion.

8. The turbine blade as defined in claim 1, wherein the chord forms a boundary of the outer edge such that the stiffening rib is located only in a region encompassed between the pressure surface and the chord.

9. The turbine blade as defined in claim 6, wherein the stiffening rib is located exclusively in a region of the airfoil portion enclosed between the leading edge and the trailing edge.

10. A gas turbine engine comprising a compressor section, a combustor section and a turbine section, the turbine section including at least one rotor having a plurality of circumferentially-arrayed turbine blades, each turbine blade including a root portion and an airfoil portion extending radially outward from the root portion, the airfoil portion having a blade tip formed at a radial extremity of the airfoil portion, the airfoil portion being un-cooled and substantially solid from the root portion to the blade and thus free of internal cooling passageways therein, and a stiffening rib located at the blade tip and projecting from a pressure side of the airfoil portion, the stiffening rib including an inner radial surface, an outer radial surface located opposite the inner radial surface, and a remote outer edge located between the inner and outer radial surfaces, the outer edge being spaced apart perpendicularly from the pressure surface of the airfoil portion, and the stiffening rib extending in a chordwise direction beginning at the trailing edge and spanning at least a portion of a region of the airfoil portion enclosed between the trailing edge and the leading edge.

11. The turbine blade as defined in claim 10, wherein the stiffening rib extends in at least a chordwise direction beginning at the trailing edge.

12. The turbine blade as defined in claim 11, wherein the stiffening rib extends from the trailing edge to the leading edge.

13. The turbine blade as defined in claim 10, wherein the airfoil portion is located exclusively between the leading edge and the trailing edge.

14. The turbine blade as defined in claim 10, wherein the outer edge of the stiffening rib is collinear with a chord of the airfoil portion, the stiffening rib projecting from the pressure surface of the airfoil portion to the chord.

15. The turbine blade as defined in claim 10, wherein the outer edge has a radius of curvature such that the stiffening rib forms a concave shape.

16. The turbine blade as defined in claim 10, wherein the stiffening rib and the blade tip are both located in a common tangential plane defined by a chordwise axis and a tangential axis of the turbine blade.

17. The turbine blade as defined in claim 10, wherein the inner radial surface and the outer radial surface of the stiffening rib are located in planes which are parallel to one another and which are both perpendicular to the pressure surface.

18. The turbine blade as defined in claim 10, wherein a chord of the airfoil portion at the blade tip defines a boundary of the outer edge of the stiffening rib such as to form a limit of the extension of the stiffening rib from the pressure surface.

* * * * *